United States Patent
Awazu et al.

(10) Patent No.: US 6,458,298 B1
(45) Date of Patent: Oct. 1, 2002

(54) PROCESS FOR MOLDING CERAMICS

(75) Inventors: Tomoyuki Awazu; Yasushi Tsuzuki; Akira Yamakawa, all of Itami (JP)

(73) Assignee: Sumitomo Electric Industries, Ltd. (JP)

( * ) Notice: Subject to any disclaimer, the term of this patent is extended or adjusted under 35 U.S.C. 154(b) by 0 days.

(21) Appl. No.: 08/505,069

(22) Filed: Jul. 21, 1995

Related U.S. Application Data

(63) Continuation-in-part of application No. 08/109,369, filed on Aug. 19, 1993, now abandoned.

(30) Foreign Application Priority Data

Sep. 10, 1992 (JP) ............................... 4-241874
Mar. 12, 1993 (JP) ............................... 5-52364

(51) Int. Cl.$^7$ ................................. B28B 1/26
(52) U.S. Cl. ................... 264/40.1; 264/40.5; 264/86
(58) Field of Search ............... 264/40.1, 40.5, 264/86

(56) References Cited

U.S. PATENT DOCUMENTS

| | | | | |
|---|---|---|---|---|
| 4,062,914 A | * | 12/1977 | Hinzpeter ................. | 264/40.1 |
| 5,035,845 A | * | 7/1991 | Gasiorek ................... | 264/40.1 |
| 5,156,856 A | * | 10/1992 | Iwasaki et al. .............. | 425/85 |
| 5,198,167 A | * | 3/1993 | Ohta et al. .................. | 264/86 |
| 5,296,175 A | * | 3/1994 | Iwasaki et al. .............. | 264/86 |
| 5,299,621 A | * | 4/1994 | Claar et al. ................. | 164/98 |
| 5,385,701 A | * | 1/1995 | Awazu et al. ............... | 264/86 |

FOREIGN PATENT DOCUMENTS

| | | |
|---|---|---|
| EP | 0587160 | 3/1994 |
| GB | 790027 | 1/1958 |
| GB | 1072997 | 6/1967 |

OTHER PUBLICATIONS

Principles of Ceramic Processing by Reed, Wiley–Interscience pp. 427–435, 1994.*
Patent Abstracts of Japan JP6262612 Sep. 20, 1994, Molding Method for Ceramic and Mold.

* cited by examiner

Primary Examiner—Christopher A. Fiorilla
(74) Attorney, Agent, or Firm—Bierman, Muserlian and Lucas

(57) ABSTRACT

A wet molding method in which a ceramic slurry is charged into a cavity and uniaxially pressed by a punch to remove excess liquid from a portion of the slurry facing the punch to effect molding, the method being improved by maintaining at least one of the following conditions;

(a) the pressing of the slurry is stopped at a time between T and 1.5 T, T being defined as the pressing time necessary to remove sufficient excess liquid from the slurry in the mold to produce a molded mass; or (b) the punch displacement position at a time at which sufficient excess liquid is removed from the slurry in the mold to produce a molded mass is less than 17% of the total mold length.

23 Claims, 6 Drawing Sheets

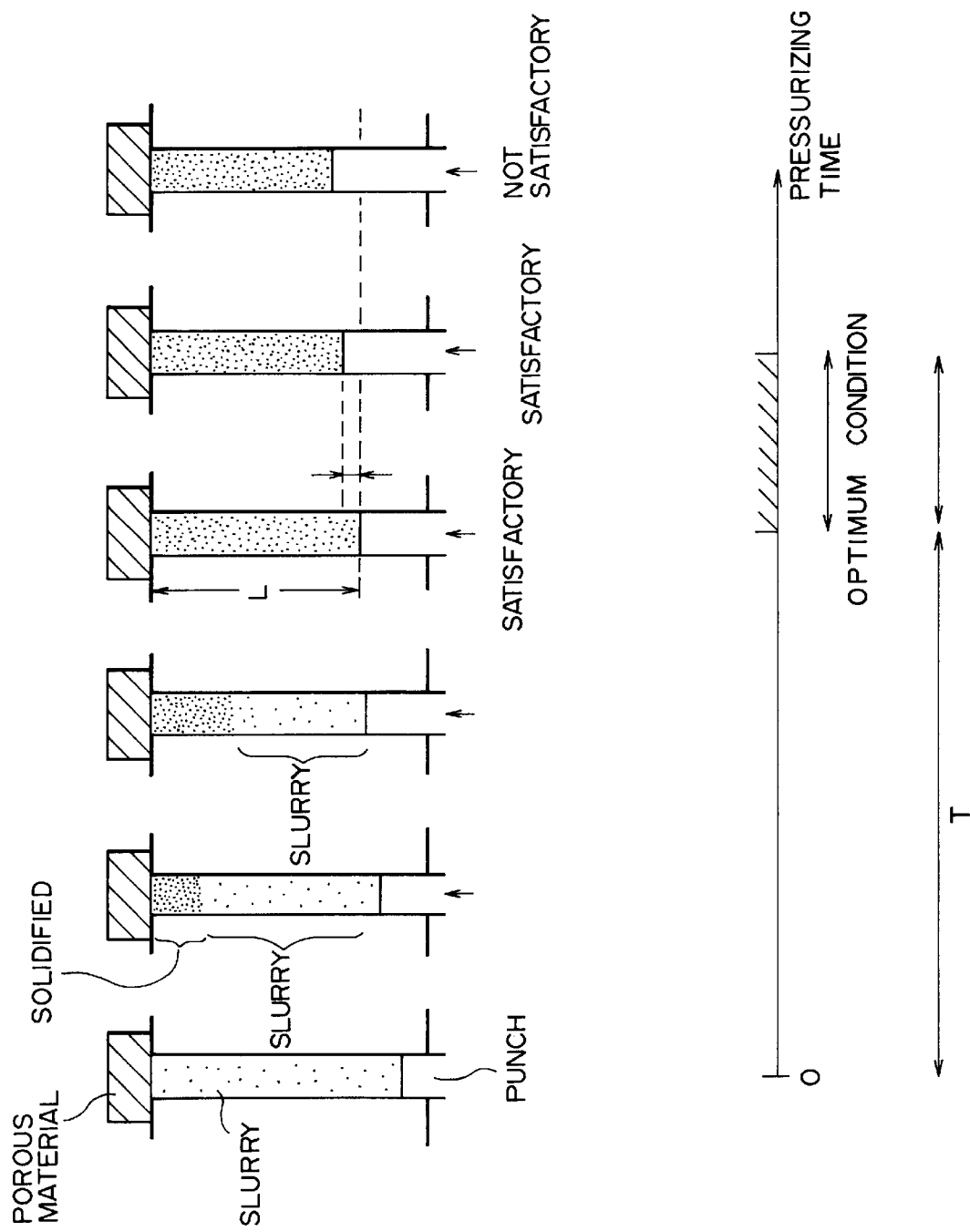

PROCESS FOR MOLDING CERAMICS

This is a Continuation-in-part of U.S. patent application Ser. No. 08/109,369, filed Aug. 19, 1993 now abandoned, which claimed priority of Japanese Patent Applications 4-241874, filed Sep. 10, 1992 and 5-52364, filed Mar. 12, 1993.

BACKGROUND OF THE INVENTION

1. Field of the Invention

This invention relates to a molding process for various ceramic products, particularly to a pressure slipcast molding of ceramic slurry, and a mold used therefore.

2. Description of the Prior Art

In a pressure slipcast molding process, a mixture consisting of powder and liquid (hereinafter "slurry") is pressurized to discharge the liquid therefrom. In this process, the higher the pressure is, the more densely the powder is compacted. Thus, the resulting molded article has a high geometric stability and the liquid discharge and from the slurry can be made in reduced time. In the conventional pressure slipcast molding, porous molds made from gypsum or plastics have been used for the liquid discharge, (e.g. Japanese Patent Publication No. 2-42321, Japanese Patent Laid-Open Nos. 60-70701, 63-3906 and 61-297103).

However, since these porous materials constituting the conventional molds do not have a sufficient strength, the molding pressure is, at most only 10 kg/cm$^2$ when a gypsum mold is used and about 50 kg/cm$^2$ when a plastics mold is used. If the molding pressure exceeding this upper limit is applied to the porous mold, such high pressure may bring about the breakage of the molds. Thus, there is limitation in improving the density of ceramic molded articles and it becomes impossible to mold in a short time, depending on the shape or the size. In the method of molding ferrite slurry and so on, a filter cloth 9 and a filter paper 10 are, as shown in FIG. 3, set at the frontal face of a metallic mold 3, which has holes of 1–3 mm inside diameter for dehydration. And only liquid (water) is discharged from the holes of the mold through the filter.

In the method as shown in FIG. 3, since the liquid discharge part consists of the filter cloth 9, filter paper 10 and mold 3 having the holes 4 for dehydration, a high molding pressure can be applied. However in this case, when pressure is applied, the powder in the slurry enters the holes for dehydration pressing on the filter paper or filter cloth and then it becomes protrusions 11 are formed on the surface of the molded product, corresponding to the holes as shown in FIG. 4. Therefore, an after-treatment is necessary to remove the protrusion from the molded product, thereby resulting in a high production cost.

SUMMARY OF THE INVENTION

With the above in view, the present invention was made to overcome the above and other problems encountered in the prior art.

It is an object of the present invention to provide a process for slipcast molding of ceramics, with a smooth surface in which a higher pressure is applied as compared with a conventional process.

Another object of the present invention is to provide molds used for carrying out the above-mentioned molding process.

The basic idea of this invention is to enable the application of high pressure by using a mold made of a high-strength porous metal or ceramic material in a pressure slipcast molding process of a ceramic slurry.

To the above and other ends, the present invention provides a process for molding a ceramic slurry, in which a mold made wholly or partially of a porous metal or a porous ceramic is used.

The present invention also provides a mold made wholly or partially of a porous metal or a porous ceramic, for the purpose of molding ceramic slurry.

BRIEF DESCRIPTION OF THE DRAWINGS

FIG. 8 is a view illustrating a pressurizing steps of the present invention.

DETAILED DESCRIPTION OF THE PREFERRED EMBODIMENTS

Figure 1:
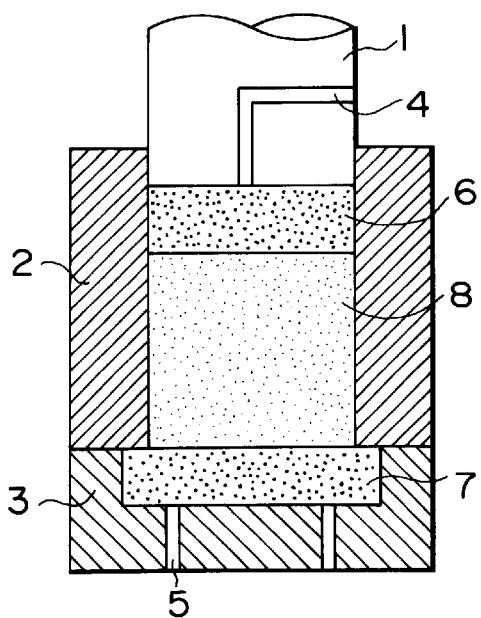
FIG. 1 is a vertical cross-sectional view showing a casting method employing a casting mold according to an embodiment of the present invention.

The basic concept of the present invention consists in that, in pressure slipcast molding of ceramics, a casting mold made of metal or ceramic of a higher strength is employed to enable application of a higher pressure.

In case of using a material, whose main component is Fe, e.g. stainless steel, it becomes possible to develop a molding pressure of 100 kgf/cm$^2$. Even a pressure up to 1000 kgf/cm$^2$ can be developed depending on the mold's design. Metallic materials are not limited to Fe metals, Cu metals, Al metals and so on.

Similarly, in case of using a hard material, e.g. Al$_2$O$_3$. A pressure not lower than 100 kgf/cm$^2$ may be developed. A pressure up to 1000 kgf/cm$^2$ is also possible depending on the mold's design. Ceramics materials are not limited to Al$_2$O$_3$ ceramics, Si$_3$N$_4$ ceramics, BN ceramics and so on.

Also, it is possible to polish the surface of porous metals and ceramics, to decrease their surface roughness, and to make it a mirror plane in some cases. Thus, when the smoothed surface is used for a mold touching the slurry, molded ceramic articles can be easily taken out of the mold and also be prevented from breaking. Furthermore, the surface appearance of the molded ceramic articles become excellent. In case of using ceramics for porous materials, ceramics have a high chemical resistibility against acid, alkali and so on. Ceramics are neither corroded nor rusted and have sufficient durability. And they are excellent in strength and toughness, compared with other materials, therefore they do not become fatigued and have sufficient durability mechanically too.

The larger the diameters of pores in the porous material are, the more easily liquid in the slurry is discharged. But if the pores are too large, ceramic powders in the slurry are carried away. Therefore the upper limit of the pores' size should be determined according to the diameters of ceramic powders in the slurry.

In the above-described casting method by the liquid discharge from the slurry, it is necessary that diameters of pores in the porous materials, which are components of a mold the wholly or partially, should be not less than 0.1 $\mu$m so that dehydration and molding can be carried out in industrially practical time. If diameters of the pore are less than 0.1 $\mu$m, in case of using water for liquid of the slurry, the surface tension becomes higher, keeps the liquid from flowing into pores of porous materials, and makes it difficult to discharge the liquid in the slurry through pores of porous materials.

It has been found that powders in the pressurized slurry tend to undergo cohesion to form agglomerates (hereinafter referred to as "secondary particles"). The maximum diameter of the pores is twenty times as high as the diameter of the secondary particles of powders in the slurry and it can prevent the powders from flowing.

Namely, if the powders flow into pores in porous materials from the surface by the given pressure, the adherence between molded ceramic articles and porous materials becomes intense, by an anchor effect, and molded ceramic articles will be broken or chipped. When diameters of pores in the porous materials are not more than twenty times as large as the diameter of the secondary particles in the slurry, we have confirmed that powders produce bridging and do not enter the inside of pores, and that the molding can be done in a short time and mold release can be easy.

When a surface roughness of the pore-free portion of porous metal or ceramics, whose surface touches the slurry, is more than 0.4 $\mu$m Rz, the adherence between molded ceramic articles and porous materials becomes intense by an anchor effect. Particularly in case of applying high pressure, the adherence between molded ceramic articles and porous materials becomes intense because of the pressure applied to the part and it makes mold release difficult.

When a surface roughness is not more than 0.4 $\mu$m Rz, the adherence at the above-mentioned portions becomes weak to enable the molded articles to be released smoothly from the mold. Throughout the specification, all surface roughness values are indicated in terms of the ten-point mean roughness Rz defined in Japanese Industrial Standard (JIS) B 0601.

Figure 3:
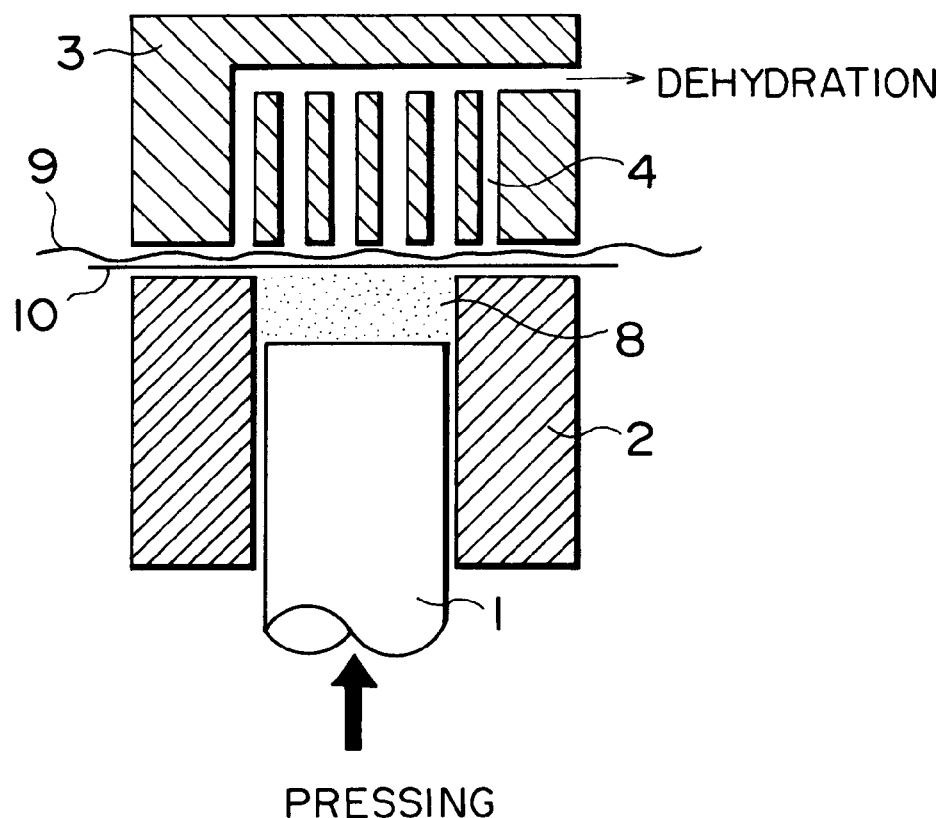
FIG. 3 is a view similar to FIG. 1 employing a conventional casting mold.
Figure 4:
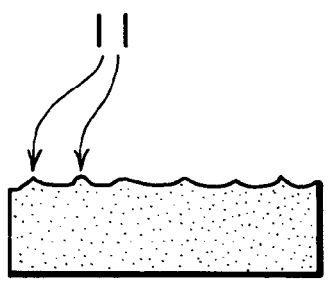
FIG. 4 is a vertical cross-sectional view showing a cast article obtained using the conventional casting mold.
Figure 5:
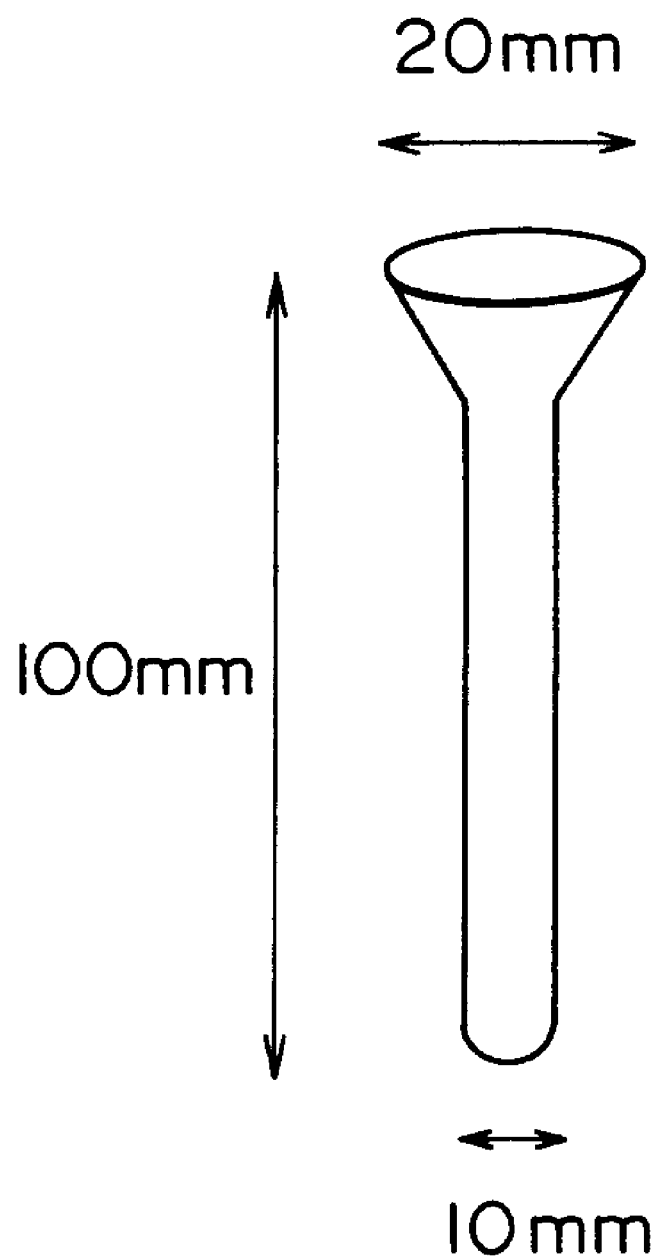
FIG. 5 is a view showing molded article in the form of circular trumpets.

In the invention, it is also possible to set filter paper and/or filter cloth on the surface of porous metal or ceramics facing the slurry. Even if diameters of pores on the surface of porous metal or ceramics are so large as to let the powders in the slurry enter the pores, the filter prevents powders from entering them and makes release easier. And if the surface of porous metal or ceramics is rough, the filter does not bring about an anchor effect and makes release smooth. Because the filter, made of paper and/or cloth has high flexibility, therefore it is possible to release the filter from molded ceramic articles slowly without producing chips. Protrusions on the surface of ceramics, in the conventional method as shown in FIG. 3, do not enter pores of porous metal or ceramics through the filter and then molded ceramic articles have an excellent surface. In order to prevent powders in the slurry from passing through the filter and in order to get considerable speed for excluding the liquid, it is desirable that the average diameter of pores in the filter paper and/or filter cloth should be not less than 0.1 $\mu$m and not more than twenty times as large as the diameter of the secondary particles in the slurry. To discharge the liquid at satisfactory speed for industrial needs, the average diameter of pores needs to be more than 0.1 $\mu$m. If the average diameter is larger than twenty times as large as the average diameter of the secondary powder in the slurry, it causes efflux of powder, namely a permeation of the slurry through the filter for the same reason as discussed above. The paper filter may be formed of any material customarily employed for the paper filter, while the cloth filter may be formed of any material, such as synthetic fibers, e.g. polyester, nylon or acrylic fibers, or natural fibers, such as cotton, provided that such material can be woven or knitted to form a cloth.

It is also possible that liquid in the slurry is sucked dry through porous ceramics from the back and is discharged forcibly. In this case, filter paper and/or filter cloth could be placed on the surface of porous metal or ceramics facing the slurry. Such forcible suction makes it possible to shorten a stiffening time of powders in the slurry and is effective for a molded ceramic articles having an increased wall thickness.

With the pressure molding according to the present system, the slurry is pressurized by moving a punch to effect mechanical compression and discharge a liquid. Filter cloth are attached to a portion freed the liquid for preparing a molded article. The liquid in the slurry is passed via the molded article so as to be discharged out of the system. If the pressurization during molding is insufficient, liquid removal from the slurry in the vicinity of the punch is insufficient so that a non-solid portion is left. If the pressurization is excessive, the punch is pushed wastefully and the molded article is mechanically compressed so that the packing density of the powders in the molded article is locally increased in the vicinity of the punch with progress in the mechanical compression of the molded product. The result is deformation and insufficient dimensional accuracy of a sintered body as the product. The molded product exhibiting considerable fluctuations in density is susceptible to cracking and destruction. From this it follows that the timing of the end of pressurization needs to be set nearly when the sufficient amount of liquid is removed and all slurry has solidified. The optimum timing of the end of pressurization can be controlled by controlling the time or the amount of punch displacement.

Figure 7:
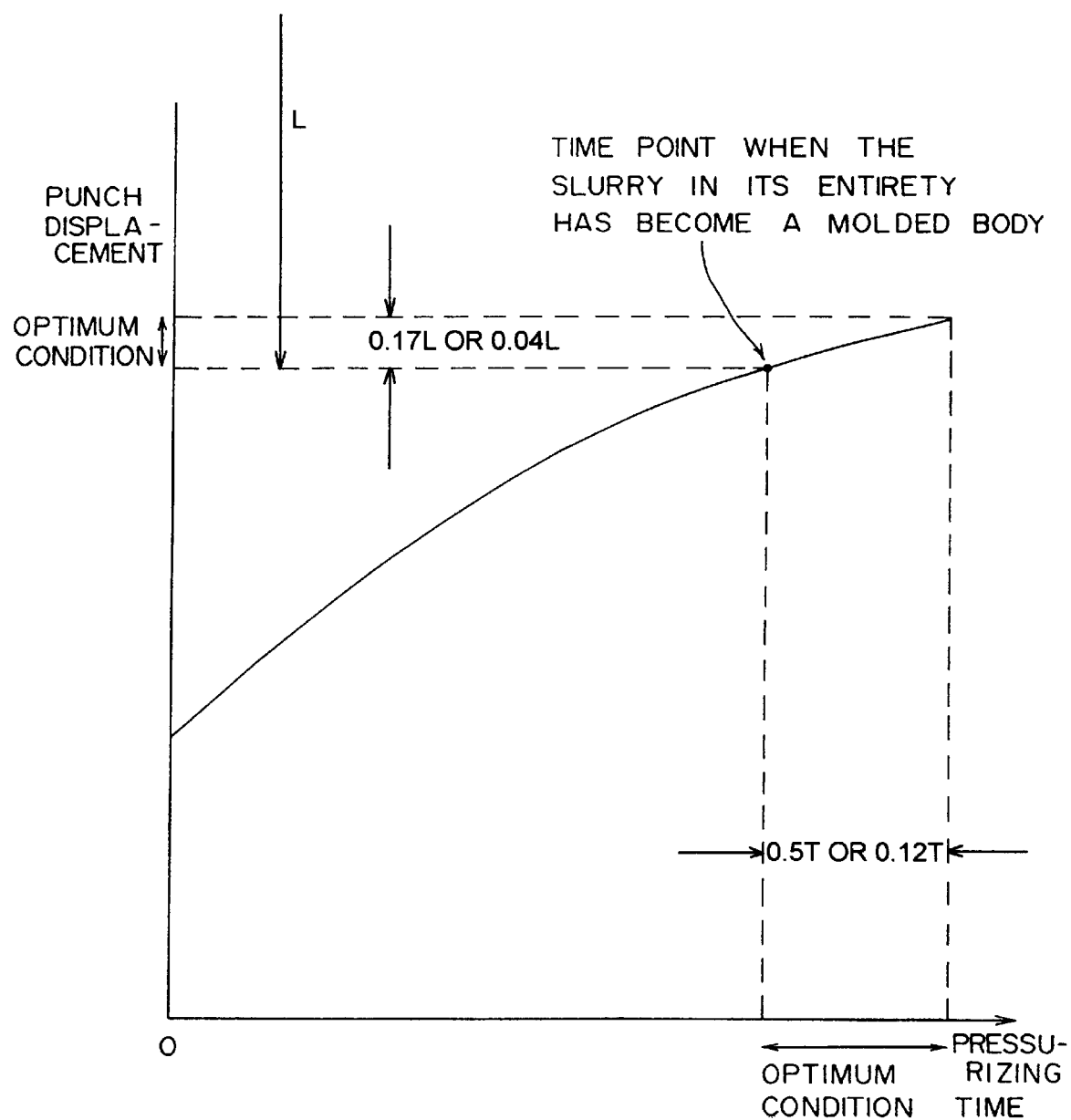
FIG. 7 is a graphical representation showing the relation between pressurizing time and punch position.

FIGS. 7 and 8 illustrates a pressurizing step of the present invention. FIG. 7 schematically shows the relation between pressurizing time and punch displacement. FIG. 8 schematically shows the molding state of a slurry at each stage of the pressurizing time. A point at which the packing density of ceramic particles in the slurry becomes uniform in the pressurizing direction, in other words, a point at which the concentration gradient in the pressurizing direction of ceramic particles in the slurry becomes null, is defined as the state in which all the slurry charged into the cavity has solidified. The pressurizing time which elapses until solidification is defined at T. The above will be understood or comparing the unsolidified stage shown at the third from left to the stage of the solidified slurry shown at the forth from left.

According to the present invention, pressurization is caused to proceed further continuously for a pre-set time from this stage and is then stopped in order to take out a molded product from the mold. By carrying out this pressurization for a pre-set time since solidification, the molded product may be safeguarded against damage and lowering in dimensional accuracy.

The time control can be achieved by terminating the pressurization within 50% of the pressing time determined from the time at which the slurry in the mold is dehydrated and all slurry turned into a molded article. In other words, pressing of the slurry is completed at a time between T and 1.50T, wherein T is the pressing time necessary to remove sufficient excess liquid from the slurry in the mold to produce a molded mass. If the timing of the end of pressurization exceeds 50%, density fluctuations can occur and the sintered product is deteriorated in dimensional stability. In the worst case, cracks are produced.

If no cracks due to density fluctuations are produced, the molded product is abnormally compressed, so that it becomes intimately affixed to the punch or a solvent removing portion resulting in lowered mold release properties and crack exfoliation. In addition, since the molded article tends to be expanded (springback) when being taken out of the mold, a strong friction operates between the mold and the molded article thus resulting in the mold injuring the molded article or producing cracks.

Such effect on the molded article is manifested severely in characteristics of the sintered article thus lowering the dimensional accuracy of the sintered article. In addition, mechanical properties of the sintered article, such as three-point strength, are lowered significantly.

The pressurization and timing is related with the shape of the molded article. That is, the condition is changed depending upon the ratio of the size of the article portion thrust by the punch to the size of the proceeding direction of the punch. This ratio (molding length/maximum size in the cross-section) is termed the aspect ratio. With a molded article having a large aspect ratio, the force of friction acting between the molded article and the lateral surface of the mold is so large that uniform pressure can hardly be applied to the entire molded article. If excess pressure is applied to an article under such state, significant non-uniform pressure is produced in the longitudinal direction, such that only a small amount of an excess pressure induces density fluctuations or fracture of molded articles. Thus it becomes necessary to strictly control the pressurization end timing.

The total pressurizing time is up to 1.50 times T, that is in a range of from T to 1.5T for the aspect ratio of the molded article of 1 or less and is up to 1.12 times T, that is in a range of from T to 1.12T for the aspect ratio exceeding 1. If the aspect ratio is within this range, the lowering of molded release properties or damages to the molded article due to friction with the mold may be suppressed by the above-mentioned reason. In addition, the sintered article may be improved in dimensional accuracy or strength.

The pressing condition may be implemented by the amount of the punch displacement. That is, the pressurization is terminated within the time the punch is moved distance equal to 17% (0.17 l) of the molding length L, as shown in FIG. 8, as measured from a punch position at which excess liquid is removed from the slurry in the mold and the entire slurry has solidified. In other words, the punch displacement could go beyond a point at which sufficient excess liquid is removed from the slurry in the mold and the entire slurry has solidified. The punch displacement stops from a point at which sufficient excess liquid is removed from the slurry in the mold to produce a molded mass is 17% (0.17 L) or less of the total molding length (L). If the punch is moved for pressurization in excess of 17% of the molding length, the molded article can undergo density fluctuations and, in extreme cases, cracks occur.

In addition, there are occasions where the molded article is injured due to the lowering of the mold release properties and to friction with the mold. The sintered product may also be severely affected in dimensional accuracy and mechanical strength, such that, if the aspect ratio exceeds 17%l, poor dimensional accuracy or lowering in mechanical properties, such as three-point bending strength, is produced. In addition, as for the pressurizing condition, the allowable control range of the punch displacement is changed depending upon the range of the aspect ratio. That is, when the aspect ratio of the molded product exceeds 1, pressurization ceases within the time the punch is moved a distance equal to 4% of the molding length from a punch position at which any excess solvent is removed from all the slurry in the mold and the molding mass is turned into the molded article. If the punch is moved for pressurization beyond a point corresponding to 4% of the molding length, the molded article undergoes density fluctuations and, in an extreme case, cracking is incurred.

By the reason given hereinabove, the lowering in mold release properties, damages to the molded article due to friction with the mold, poor dimensional accuracy of the sintered product or deterioration in mechanical properties may be incurred.

The pressure molding of the present system is the pressing technique equivalent to pressure mechanical compression at an extremely high pressure. Since a correspondingly high mechanical compression acts on the liquid removing portion, it is desirable to use a material of high mechanical strength; a porous member of metal or ceramics. If a filter such as a filter paper and/or a filter cloth is provided on the front surface of a slurry contacting portion of a porous member, mold release properties are improved and satisfactory molded products are produced without being constrained by the state of the porous member, such as pore size or surface roughness.

With the present system, mechanical compression is applied to the liquid removing portion. If such compression should occur repeatedly at a higher pressure of not less than 200 kfg/cm$^2$, even a porous member of metal or plastics undergoes fatigue to produce surface destruction or deformation. Thus, it is desirable to use a metal plate having an opening of 0.8 mm or less in diameter in place of the porous member in case of using a filter. Such a metal plate is superior in mechanical durability and is not susceptible to fatigue. If the opening in the metal plate exceeds 0.8 mm, the powders may press the filter under the molding pressure to enter the pores to form a protrusions having a shape similar to that of opening 1 which is left on the surface of the molded article to affect the surface state of the molded article.

The pore size of the porous member in contact with the slurry needs to be not more than 20 times the mean particle size of the secondary particles of the powders present in the slurry and not less than 0.1 $\mu$m by reason of the time of liquid removal and mold release properties. The surface roughness of the porous member in contact with the slurry needs to be not more than 0.4 $\mu$m Rz by reason of the mold release properties. The surface roughness of the porous member in contact with the slurry needs to be not more than 0.4 $\mu$m Rz by reason of the mold release properties of the molded article. The pore diameter of the filter paper or filter cloth in contact with the slurry needs to be not less than 0.1 $\mu$m and not more than 20 times the mean particle size of the secondary particles of the powders present in the slurry by reason of mold release properties and the time for solvent removal.

With the present system, the punch is moved within a die or mandrel and the slurry is mechanically compressed as the punch is slid against the inner wall of the die. During slurry compression, slurry effluence occurs by reason of the clearance of the sliding portions, such that the slurry falls into shortage and solidification is not completed. Such leakage is not induced when only press molding the powders as is conventionally done. To prohibit slurry leakage due to such clearance, a sealant is provided at the sliding portion. O-rings formed of rubber, resin or metal, for example, may be employed as the sealant. With the present system, molding is achieved as the punch is slid against the die. It is therefore preferable for the die and the punch to be formed of the material which is superior in abrasion resistance and is not susceptible to fatigue due to repeated sliding of the punch relative to the die. That is, with the present molding system, it is advantageous to use a die and a punch exhibiting high mechanical strength capable of withstanding high pressure and high abrasion resistance. As such material, a metal material, such as cemented carbide or high-speed steel is preferred.

If the state of the slurry is defined in the system of the present application, it becomes possible to produce a molded product of an intricate shape which cannot be produced with the conventional uniaxial pressurization employing a die and a punch. A product having a shape with the aspect ratio exceeding 3, a trumpet shape with a changing cross-section or a cylindrical shape can be molded. For producing molded articles of such shape, the slurry needs to be flowed uniformly into the mold, so that the slurry is preferably of a viscosity not higher than 5000 cps.

In addition, in order for the slurry viscosity to be 5000 cps or less, the volume fraction of powders should in general be 60 vol % or less, depending upon the state and types of the starting powders and the solvent. There is no particular limitation to the powder type, particle size particle size distribution or solvent type.

The invention will be more clearly understood with reference to the following examples.

EXAMPLE 1

A mixture of powders was made by adding $Y_2O_3$, $Al_2O_3$ as assistant agents to $Si_3N_4$ powders, having an average diameter of 0.7 μm, then mixing. it in ethylalcohol. Water and binder were added to the mixture. Making use of a nylon ball mill, they were made into a slurry. The powder content of the slurry was set to be 40 vol. %.

Figure 2:
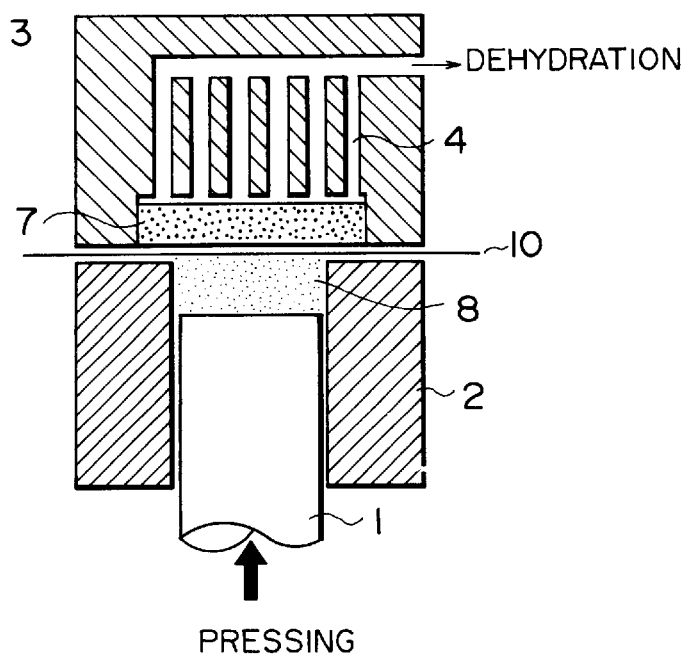
FIG. 2 is a view similar to FIG. 1, showing a casting method employing a casting mold according to a modification of the present invention.

Columns, having a diameter of 20 mm and a height of 20 mm, were molded out of the slurry. FIGS. 1 and 2 show a process for molding. Mold 3, having holes 5 for dehydration and attached to porous material 7, was set in mold 2 and the slurry was injected into it. The slurry was pressurized with a metallic punch 1 fitted with a porous punch 6 at its terminal end. Water in the slurry 8 was discharged by applying pressure through porous materials 6, 7. As a result thereof, molded ceramic articles could be taken out.

A number of molded ceramic articles were made by this molding method under various conditions, changing porous materials and molding pressure. Table 1 shows results of the density of molded articles and molding time.

TABLE 1

| No. | Porous materials | Molding pressure (kgf/cm$^2$) | Density of molded articles (%) | Molding time (sec.) |
|---|---|---|---|---|
| 1 | SUS 316 | 5 | 49.8 | 1000 |
| 2 | SUS 316 | 20 | 50.7 | 250 |
| 3 | SUS 316 | 100 | 61.6 | 45 |
| 4 | SUS 316 | 1000 | 63.4 | 12 |
| *5 | gypsum | 5 | 48.9 | 850 |
| *6 | gypsum | 20 | gypsum fractured | — |
| *7 | resin | 5 | 49.7 | 800 |
| *8 | resin | 20 | 50.8 | 200 |
| *9 | resin | 100 | resin fractured | — |

*indicates comparisons

EXAMPLE 2

As starting powders, $Si_3N_4$ (90–95 wt %) with mean primary particle size of 0.2 μm and mean secondary particle size of 0.5 μm, as main component, $Y_2O_3$ (mean primary particle size, 0.5 μm) and $Al_2O_3$ (mean primary particle size, 0.3 μm), as additives, are employed. The starting powders were mixed in a ball mill with distilled water and admixed with a binder and thus a slurry having a volume concentration of 42 vol % of the powders was prepared.

The mean secondary particle size was 0.53 μm (due to the effect of the additive added to 0.5 μm of the main component). Using this slurry, a disc 50 mm in diameter and about 6 mm in thickness was molded. In this case, the aspect ratio was 0.12.

Molding was carried out in the same way as in Example 1, that is with the method shown in FIG. 2.

As a dehydrating part, a SUS plate having a through-hole, with a filter paper and a filter cloth placed ahead of it, was used.

In the present Example, the punch and the die were formed of cemented carbide and the mold was formed of high-speed steel. Molding was carried out under a high pressure of 300 kgf/cm$^2$.

The pressurizing conditions were controlled by the molding time or the amount of punch displacement (aspect ratio, not more than 1). With the use of the slurry quantity which will give a molding thickness of 6 mm for molding, the optimum pressurization end timing was set by time control (within a time (sec) between T and 1.50T, wherein T was the pressurization time necessary to dehydrate all the slurry in the mold to give a molded article). and punch displacement control (17% or less of the molding length as from the position at which all the slurry in the mold is dehydrated to give a molded article). Other molding conditions were also varied in many ways.

The relation of mold release properties and the molding state and various conditions are as shown in Table 2. The produced molded article was divided in the cross-section in five equal parts and the density of the molded product was measured to calculate density fluctuations in the molded article from the maximum and minimum values.

A sintered article was prepared from this molded article and sliced into test pieces for bending test (3×4×35 mm) in order to measure the three-point strength (n=30).

TABLE 2

| No. | | Claims | method | filter | mean filter pore size (μm) | filter material | mean pore size of SUS (μm) | molding times (sec) | punch position (mm) | punch displacement (mm) | sealing O-ring | die material |
|---|---|---|---|---|---|---|---|---|---|---|---|---|
| 1 | Comp. Ex. | 12, 9 | 3 | present | 5.0 | filter paper + cloth | through holes 700 | 20x | 6.1x | −1.0 | present | cemented carbide |
| 2 | Ex. | 12, 9 | 3 | present | 5.0 | filter paper + cloth | through holes 700 | 26 | 6.0 | 0.0 | present | cemented carbide |
| 3 | Ex. | 12, 9 | 3 | present | 5.0 | filter paper + cloth | through holes 700 | 32 | 5.4 | 0.6 | present | cemented carbide |
| 4 | Comp. Ex. | 12, 9 | 3 | present | 5.0 | filter paper + cloth | through holes 700 | 41x | 4.9 | 1.1 | present | cemented carbide |
| 5 | Ex. | 9 | 3 | present | 5.0 | filter paper + cloth | through holes 500x | 28 | 6.0 | 0.0 | present | cemented carbide |
| 6 | Comp. Ex. | 9 | 3 | present | 5.0 | filter paper + cloth | through holes 900x | 26 | 6.0 | 0.0 | present | cemented carbide |
| 7 | Comp. Ex. | 9 | 3 | present | 5.0 | filter paper + cloth | through holes 1100x | 26 | 6.0 | 0.0 | present | cemented carbide | x mark denotes not being claimed

| No. | | claims | density of molded body (g/cm$^2$) | molded state | mold release properties | defects of molded articles | density fluctuations (%) | bending strength (kg/mm$^2$) |
|---|---|---|---|---|---|---|---|---|
| 1 | Comp. Ex. | 12, 9 | 62.5 | dehydration incomplete | — | non-solidified | 1.8 | — |
| 2 | Ex. | 12, 9 | 63.4 | good | good | good | 0.3 | 138 |
| 3 | Ex. | 12, 9 | 63.6 | good | good | good | 0.4 | 141 |
| 4 | Comp. Ex. | 12, 9 | 64.3 | good | good | cracking | 1.9 | 82 |
| 5 | Ex. | 9 | 63.6 | good | good | good | 0.3 | 137 |
| 6 | Comp. Ex. | 9 | 63.0 | good | good | protruded height of molded product 0.8 mm | 0.8 | 140 |
| 7 | Comp. Ex. | 9 | 63.1 | good | good | protruded height of molded product 0.95 mm | 0.9 | 141 |

EXAMPLE 3

As starting powders, Al$_2$O$_3$ (mean primary particle size, 0.2 μm; mean secondary particle size, 0.4 μm) was used. The starting powders were mixed in a ball mill with distilled water and admixed with a binder to produce a slurry having a volume concentration of the powders of 50 vol %.

Using this slurry, a column (cylinder) 15 mm in diameter and about 60 mm in length was molded by the same molding method as that of Examples 1 and 2 shown in FIG. 2. In this case, the aspect ratio was 4.

As a dehydrating part, a plate of SUS with a through-hole, having a filter paper and/or a filter cloth ahead of it, was used.

In the present Example, the punch and the die were formed of cemented carbide and the mold was formed of high-speed steel. Molding was carried out under a high pressure of 500 kgf/cm.

The pressurization during molding was controlled by controlling the molding time or and/or the amount of punch displacement (aspect ratio, 1 or high).

The quantity of slurry which will give the molding length of 60 mm was used for molding. The optimum pressurization end timing was by time control (within a time (sec) between T and 1.12T, wherein T was the pressurization time necessary to dehydrate all the slurry in the mold to five a molded product) and by punch displacement control (within 4% of the molding length as from the position when all the slurry in the molded is dehydrated and turned into slurry).

Based on the range in this setting method, molding was carried out using variable molding time lengths and punch displacement amounts.

Filter pore sizes, as other conditions, were changed in many ways.

These various conditions, state of molding and mold release properties are as shown in Table 3. The molded article was divided into five equal parts along its length and the density of the molded article was measured in order to measure density fluctuations in the molded article from the maximum and minimum values.

TABLE 3

| No. | Claims | method | filter | mean filter pore size (μm) | filter material | mean pore size of SUS (μm) | molding times (sec) | punch position (mm) | punch displacement (mm) | sealing O-ring | die material |
|---|---|---|---|---|---|---|---|---|---|---|---|
| 9 | Comp. Ex. | 3, 4, 9 | 3 | present | 5.0 | filter paper + cloth | through holes 700 | 116x | 51.8x | −1.8 | present | cemented carbide |
| 10 | Ex. | 3, 4, 9 | 3 | present | 5.0 | filter paper + cloth | through holes 700 | 124 | 60.0 | 0.0 | present | cemented carbide |
| 11 | Comp. Ex. | 3, 4, 9 | 3 | present | 5.0 | filter paper + cloth | through holes 700 | 132 | 47.2x | 2.8 | present | cemented carbide |
| 12 | Comp. Ex. | 3, 4, 9 | 3 | present | 5.0 | filter paper + cloth | through holes 700 | 128 | 59.8 | 1.2 | present | cemented carbide |
| 29 | Comp. Ex. | 10 | 3 | present | 27.7x | filter cloth | through holes 700 | 128 | 59.8 | 1.2 | present | cemented carbide |
|  | Comp. Ex. | 10 | 3 | present | 15.2x | filter cloth | through holes 700 | 127 | 59.8 | 1.1 | present | cemented carbide | x mark denotes not being claimed

| No. | claims | density of molded body (g/cm²) | molded state | mold release properties | defects of molded articles | density fluctuations (%) | bending strength (kg/mm²) |
|---|---|---|---|---|---|---|---|
| 9 | Comp. Ex. | 3, 4, 9 | 71.3 | dehydration incomplete | — | non-solidified | 1.7 |
| 10 | Ex. | 3, 4, 9 | 74.0 | good | good | good | 0.3 |
| 11 | Comp. Ex. | 3, 4, 9 | 74.1 | good | good | good | 0.3 |
| 12 | Comp. Ex. | 10 | 74.8 | good | good | cracking | 3.9 |
| 29 | Comp. Ex. | 10 | 59.5 | slurry exrded | — | non-solidified | 2.5 |
|  | Comp. Ex. | 10 | 60.1 | slurry extrded | — | non-solidified | 2.3 |

EXAMPLE 4

The slurry was made by mixing together $Al_2O_3$ powders having average diameter of 1 μm, distilled water using a ball mill and admixing with a binder. The powder content of the slurry was set to be 53 vol. %. Columns, having a diameter of 20 mm and a height of 20 mm, were molded out of the slurry using the molding method illustrated in FIG. 1.

Stainless steel, having different diameters of pores and surface roughness, was used as porous materials, and the molding pressure applied in this case was 200 and 800 kgf/cm².

The diameter of pores on the surface was determined by taking the average through observations under a microscope. Table 4 shows results of the density of molded articles, molding time and mold release properties with respect to the porous materials, under various conditions.

TABLE 4

| No. | Molding pressure (kgf/cm²) | Average diameter of pores of porous materials (μm) | Surface roughness of porous materials μm in Rz | Density of molded articles (%) | Molding time (sec.) | Status of mold release |
|---|---|---|---|---|---|---|
| 1 | 200 | 0.07 | 0.2 | — | not stiffened in 300 | — |
| 2 | 200 | 0.53 | 0.2 | 67.7 | 79 | satisfactory |
| 3 | 200 | 0.53 | 0.5 | 67.4 | 77 | peeled off |
| 4 | 200 | 4.8 | 0.3 | 68.8 | 53 | satisfactory |
| 5 | 200 | 4.8 | 0.6 | 68.7 | 54 | peeled off |
| 6 | 200 | 21.3 | 0.3 | 67.6 | 42 | peeled off |
| 7 | 800 | 0.07 | 0.2 | — | not | — |

TABLE 4-continued

| No. | Molding pressure (kgf/cm²) | Average diameter of pores of porous materials (μm) | Surface roughness of porous materials μm in Rz | Density of molded articles (%) | Molding time (sec.) | Status of mold release |
|---|---|---|---|---|---|---|
|  |  |  |  |  | stiffened in 300 |  |
| 8 | 800 | 0.53 | 0.2 | 69.4 | 69 | satisfactory |
| 9 | 800 | 0.53 | 0.5 | 69.2 | 68 | peeled off |
| 10 | 800 | 4.8 | 0.3 | 70.7 | 47 | satisfactory |
| 11 | 800 | 4.8 | 0.6 | 70.5 | 45 | peeled off |
| 12 | 800 | 21.3 | 0.3 | 70.0 | 35 | peeled off |

EXAMPLE 5

$Y_2O_3$, $Al_2O_3$ as assistant agents were added to $Si_3N_4$ powders having an average diameter of 0.5 μm. Then they were mixed in distilled water by making use of a ball mill. Some binder was added to the mixture and they were mixed further to make a slurry. The powder content of the slurry was 42 vol. %. Measurements of the particle size distribution indicated the mean particle diameter to be 0.53 μm.

Disks, having a diameter of 40 mm and a thickness of 5 mm, were molded out of the slurry.

FIG. 2 shows a process for molding. Conditions were changed variously; diameters of pores in the porous stainless steel, surface roughness and diameters of pores in the filter. Casting without filter and casting as illustrated in FIG. 3 were practiced for comparison. And molding pressure applied in this case was 300 kgf/cm².

Table 5 and 6 show how some conditions affect the molded ceramic articles and statuses of mold releasing. It may be seen from these Tables that satisfactory cast articles could be produced in accordance with the present invention.

TABLE 5

| No. | Process | Filter present or none | Average diameter of pores of filter (μm) | Materials of filter | Average diameter of pores of metallic materials (μm) |
|---|---|---|---|---|---|
| 1 | FIG. 2 | none | — | — | 20.1 |
| 2 | FIG. 2 | none | — | — | 72.2 |
| 3 | FIG. 2 | none | — | — | 8.2 |
| 4 | FIG. 2 | filter | 0.05 | resin film | 20.1 |
| 5 | FIG. 2 | filter | 0.05 | resin film | 72.2 |
| 6 | FIG. 2 | filter | 0.4 | filter paper | 20.1 |
| 7 | FIG. 2 | filter | 0.4 | filter paper | 72.2 |
| 8 | FIG. 2 | filter | 0.4 | filter paper | 8.2 |
| 9 | FIG. 2 | filter | 5.0 | filter paper | 20.1 |
| 10 | FIG. 2 | filter | 5.0 | filter paper | 72.2 |
| 11 | FIG. 2 | filter | 5.0 | filter paper | 8.2 |
| 12 | FIG. 2 | filter | 27.7 | filter cloth | 20.1 |
| 13 | FIG. 2 | filter | 27.7 | filter cloth | 72.2 |
| 14 | FIG. 2 | filter | 27.7 | filter cloth | 8.2 diameter of holes for the hydration |
| 15 | FIG. 3 | filter | 5.0 | filter paper plus filter cloth | 1200 |
| 16 | FIG. 3 | filter | 5.0 | filter paper plus filter cloth | 2000 |
| 17 | FIG. 3 | filter | 5.0 | filter paper plus filter cloth | 2400 |

TABLE 6

| No. | Surface roughness of porous metallic materials μm in R2 | Density of molded articles (%) | Molding time (sec.) | Status of molded articles and mold releasing |
|---|---|---|---|---|
| 1 | 0.2 | 62.3 | 24 | peeled off on mold releasing |
| 2 | 0.3 | 63.4 | 25 | peeled off on mold releasing |
| 3 | 1.0 | 62.2 | 30 | peeled off on mold releasing |
| 4 | 0.2 | 59.9 | 359 | took long time in dehydration |
| 5 | 0.3 | 59.8 | 354 | took long time in dehydration |
| 6 | 0.2 | 64.1 | 21 | satisfactory |
| 7 | 0.3 | 64.3 | 22 | satisfactory |
| 8 | 1.0 | 64.0 | 21 | satisfactory |
| 9 | 0.2 | 63.9 | 19 | satisfactory |
| 10 | 0.3 | 64.2 | 20 | satisfactory |
| 11 | 1.0 | 64.1 | 18 | satisfactory |
| 12 | 0.2 | 59.9 | 18 | slurry permeated the filter |
| 13 | 0.3 | 59.9 | 18 | slurry permeated the filter |
| 14 | 1.0 | 59.7 | 19 | slurry permeated the filter |
| 15 | — | 63.2 | 20 | protrusions (about 1 mmφ) formed on the molded articles |
| 16 | — | 63.1 | 19 | protrusions (about 1.7 mmφ) formed on the molded articles |
| 17 | — | 63.2 | 20 | protrusions (about 2 mmφ) formed on the molded articles |

EXAMPLE 6

A mixture of powders was made by adding $Y_2O_3$, $Al_2O_3$ as assistant agents to $Si_3N_4$ powder having an average diameter of 0.8 μm, mixing it, in ethylalcohol and by drying it. Deionized water and a binder were added to the mixture. Making use of a nylon ball mill, they were made into slurry. The powder content of the slurry was set to be 40 vol. %.

Columns having a diameter of 10 mm and a height of 25 mm, were molded out of the slurry. The process for molding was the same as Example 1, as shown in FIG. 1. Molded ceramic articles were made under various conditions, using different kinds of porous materials and changing molding pressure in the process. Table 7 shows results of the density of molded articles and molding time.

$Al_2O_3$, with different diameters of pores and surface roughness, was used. The cavity rate of the $Al_2O_3$ was 38 vol. %, and the molding pressure applied in this case was 200 and 800 kgf/cm$^2$.

The surface pore diameters were measured by observation with a microscope (SEM and optical microscope) and determined in terms of a mean value. Table 8 shows results of density of molded articles, molding time and mold release properties with respect to the porous materials under various conditions.

TABLE 8

| No. | Molding pressure (kgf/cm$^2$) | Average diameter of pores of porous materials ($\mu$m) | Surface roughness of porous materials $\mu$m in R2 | Density of molded articles (%) | Molding time (sec.) | Status of molded articles and mold releasing |
|---|---|---|---|---|---|---|
| 1 | 200 | 0.07 | 0.2 | — | not stiffened in 300 | — |
| 2 | 200 | 0.71 | 0.2 | 68.2 | 72 | satisfactory |
| 3 | 200 | 0.71 | 0.7 | 67.9 | 69 | peeled off |
| 4 | 200 | 8.7 | 0.3 | 69.3 | 50 | satisfactory |
| 5 | 200 | 8.7 | 0.7 | 69.2 | 51 | peeled off |
| 6 | 200 | 24.4 | 0.3 | 68.1 | 35 | peeled off |
| 7 | 800 | 0.07 | 0.2 | — | not stiffened in 300 | — |
| 8 | 800 | 0.71 | 0.2 | 69.5 | 65 | satisfactory |
| 9 | 800 | 0.71 | 0.5 | 69.9 | 62 | peeled off |
| 10 | 800 | 0.71 | 0.7 | 69.7 | 64 | peeled off |
| 11 | 800 | 8.7 | 0.3 | 71.2 | 37 | satisfactory |
| 12 | 800 | 8.7 | 0.5 | 71.0 | 36 | peeled off |
| 13 | 800 | 8.7 | 0.7 | 71.0 | 33 | peeled off |
| 14 | 800 | 24.4 | 0.3 | 70.5 | 28 | peeled off |

TABLE 7

| No. | Porous materials | Molding pressure (kgf/cm$^2$) | Density of molded articles (%) | Molding time (sec.) |
|---|---|---|---|---|
| 1 | $Al_2O_3$ | 2 | 50.5 | 840 |
| 2 | $Al_2O_3$ | 20 | 51.3 | 220 |
| 3 | $Al_2O_3$ | 200 | 63.5 | 32 |
| 4 | $Al_2O_3$ | 950 | 64.7 | 9 |
| *5 | qypsum | 2 | 49.2 | 720 |
| *6 | gypsum | 20 | gypsum fractured | — |
| *7 | resin | 2 | 49.9 | 720 |
| *8 | resin | 20 | 51.2 | 200 |
| *9 | resin | 200 | resin fractured | — |

*indicates comparisons

EXAMPLE 7

Using a ball mill, containing balls of $Al_2O_3$ the slurry was made by mixing together $Al_2O_3$, powder having an average diameter of 1 $\mu$m, distilled water and some binder. The powder content of the slurry was to be 53 vol. %. Columns, having a diameter of 10 mm and a height of 20 mm, were molded out of the slurry. The process for molding was the same as Example 1, as shown in FIG. 1.

EXAMPLE 8

As starting powders, $Si_3N_4$ (90 to 95 wt %) with mean primary particle size of 0.5 $\mu$m and mean secondary particle size of 1.0 $\mu$m), as a main component, $Y_{2O3}$ (mean primary particle size of 0.5 $\mu$m) and $Al_2O_3$ (mean primary particle size of 0.3 $\mu$m), as additives, were used. The starting powders were mixed in a ball mill with distilled water and admixed with a binder in order to prepare slurries with volume concentrations of 42, 52 and 62 vol %.

The mean secondary particle sizes of the slurries were 1.3, 1.8 and 2.4 $\mu$m.

Figure 6:
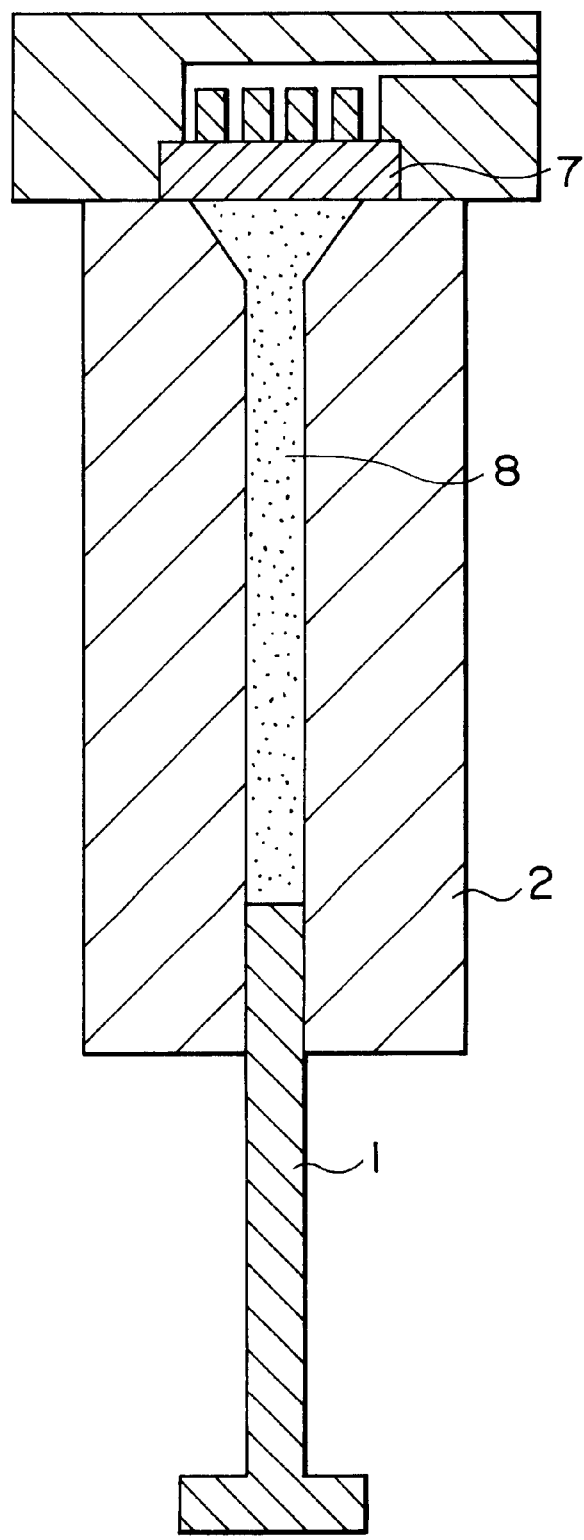
FIG. 6 is a vertical cross-sectional view showing a casting method for molded article in FIG. 5.

Using these slurries, molded articles in the form of circular trumpets having a length of 100 mm and diameters of cross-sectional surfaces of 20 mm and 10 mm on both ends were prepared (FIG. 6).

Using slurry quantities which will give 100 mm of the molding length, the optimum pressurization and timing of the three slurries were controlled so as to be within 4% of the molding length (100 mm) as from the position at which all the slurry in the mold is dehydrated and turned into molded article.

The various conditions and the states of the molded article were as shown in Table 9. Density of molded product was measured only of the columnar portion of 10 mm diameter, which were severed and taken out.

TABLE 9

| | slurry | | molding condition mean pore | punch displacement | molded article | |
|---|---|---|---|---|---|---|
| No. | volume conc. (vol %) | viscosity (cps.) | size of porous ceramic article ($\mu$m) | punch position (molding length) (mm) | (distance from 100 mm) (mm) | density of molded article (g/cm³) | defects in molded articles |
| 1 | 42 | 1320 | 4.2 | 99 | 1 | 56.1 | good |
| 2 | 42 | 1320 | 13.5 | 98 | 2 | 56.6 | good |
| 3 | 42 | 1320 | 19.7 | 100 | 0 | 56.8 | good |
| 4 | 52 | 2780 | 4.2 | 100 | 0 | 58.4 | good |
| 5 | 52 | 2780 | 13.5 | 98 | 2 | 58.2 | good |
| 6 | 52 | 2780 | 19.7 | 98 | 2 | 58.4 | good |
| *7 | 62 | 6500 | 4.2 | 99 | 1 | 64.1 | fracture at 10 mm diameter portion |
| *8 | 62 | 6500 | 13.5 | 98 | 2 | 63.1 | fracture at 10 mm diameter portion |
| *9 | 62 | 6500 | 19.7 | 98 | 2 | 63.3 | fracture at 10 mm diameter portion |

*indicates comparisons

EXAMPLE 9

$Y_2O_3$ and $Al_2O_3$ as assistant agents were added to $Si_3N_4$ powder having an average diameter of 0.5 $\mu$m. Then they were mixed in distilled water by making use of a ball mill. Some binder was added to the mixture and they were mixed further to make the slurry. The powder content of the slurry was 42 vol. %. The average diameter was indicated to be 0.53 $\mu$m by measurement of the size distribution.

Disks, having a diameter of 40 mm and a thickness of 5 mm, were molded out of the slurry through the process for molding as shown in FIG. 2.

The porous material was $Al_2O_3$. And other conditions were changed variously; diameters and surface roughness of the porous materials and diameters of pores in the filter. Molding without the filter and molding as illustrated in FIG. 3 were also performed for comparison. And molding pressure applied in this case was 300 kgf/cm². Table 10 and 11 show how some conditions affect the molded ceramic articles and its status of molded articles and mold releasing. They also show that a satisfactory molded ceramic articles could be produced in accordance with the present invention.

TABLE 10

| No. | Process | Filter present or none | Average diameter of pores of filter ($\mu$m) | Materials of filter | Average diameter of pores of ceramics materials ($\mu$m) |
|---|---|---|---|---|---|
| 1 | FIG. 2 | none | — | — | 24.4 |
| 2 | FIG. 2 | none | — | — | 72.2 |
| 3 | FIG. 2 | none | — | — | 8.7 |
| 4 | FIG. 2 | filter | 0.08 | resin film | 24.4 |
| 5 | FIG. 2 | filter | 0.08 | resin film | 72.2 |
| 6 | FIG. 2 | filter | 0.6 | filter paper | 24.4 |
| 7 | FIG. 2 | filter | 0.6 | filter paper | 72.2 |
| 8 | FIG. 2 | filter | 0.6 | filter paper | 8.7 |
| 9 | FIG. 2 | filter | 0.6 | filter paper | 72.2 |
| 10 | FIG. 2 | filter | 4.0 | filter paper | 24.4 |
| 11 | FIG. 2 | filter | 4.0 | filter paper | 72.2 |
| 12 | FIG. 2 | filter | 4.0 | filter paper | 8.7 |
| 13 | FIG. 2 | filter | 4.0 | filter paper | 72.2 |
| 14 | FIG. 2 | filter | 23.2 | filter cloth | 24.4 |
| 15 | FIG. 2 | filter | 23.2 | filter cloth | 72.2 |
| 16 | FIG. 2 | filter | 23.2 | filter cloth | 8.7 |
| 17 | FIG. 3 | filter | 4.0 | filter paper plus filter cloth | diameter of holes for the hydration 1400 |
| 18 | FIG. 3 | filter | 4.0 | filter paper plus filter cloth | 2000 |
| 19 | FIG. 3 | filter | 4.0 | filter paper plus filter cloth | 2500 |

TABLE 11

| No. | Surface roughness of porous ceramics materials (Rz) | Density of molded articles (%) | Molding time (sec.) | Status of molded articles and mold releasing |
|---|---|---|---|---|
| 1 | 0.2 | 62.8 | 25 | peeled off in releasing |
| 2 | 0.3 | 63.9 | 24 | peeled off in releasing |
| 3 | 1.0 | 62.7 | 30 | peeled off in releasing |
| 4 | 0.2 | 60.4 | 370 | took long time in dehydration |
| 5 | 0.3 | 60.2 | 368 | took long time in dehydration |
| 6 | 0.2 | 64.6 | 21 | satisfactory |
| 7 | 0.3 | 64.8 | 19 | satisfactory |
| 8 | 1.0 | 64.5 | 21 | satisfactory |
| 9 | 5.0 | 64.2 | 19 | satisfactory |
| 10 | 0.2 | 64.4 | 22 | satisfactory |
| 11 | 0.3 | 64.7 | 18 | satisfactory |
| 12 | 1.0 | 64.6 | 23 | satisfactory |
| 13 | 5.0 | 64.6 | 18 | satisfactory |
| 14 | 0.2 | 60.4 | 19 | slurry permeated the filter |
| 15 | 0.3 | 60.4 | 19 | slurry permeated the filter |

TABLE 11-continued

| No. | Surface roughness of porous ceramics materials (Rz) | Density of molded articles (%) | Molding time (sec.) | Status of molded articles and mold releasing |
|---|---|---|---|---|
| 16 | 1.0 | 60.2 | 20 | slurry permeated the filter |
| 17 | — | 63.7 | 19 | protrusions (about 1.2 mmφ) formed on the molded articles |
| 18 | — | 63.6 | 19 | protrusions (about 1.7 mmφ) formed on the molded articles |
| 19 | — | 63.7 | 18 | protrusions (about 2.3 mmφ) formed on the molded articles |

EXAMPLE 10

Using the same slurry as that of Example 6, columns, having a diameter of 10 mm and a length of 50 mm, were molded out of the slurry in the same way as shown in FIG. 2. $Al_2O_3$, having an average surface pore diameter of 24.4 μm and a surface roughness of 1.0 z, was used as porous ceramics. A filter paper having an average diameter of 1.0 μm, was used as filter. A vacuum pump (rotary) was connected with the dehydration holes in the upper mold 2, through a trap for catching water, and the pump sucked the water forcibly. Molding pressure applied in this case was 500 kgf/cm² and the sucking started simultaneously with the pressing. Table 12 shows the time and the states of molded ceramics.

TABLE 12

| No. | Forcible sucking or none | Pressing time (sec.) | Density of molded articles (%) | Status of molded articles |
|---|---|---|---|---|
| 1 | forcible sucking | 15 | 64.3 | satisfactory |
| 2 | forcible sucking | 45 | 64.5 | satisfactory |
| 3 | forcible sucking | 120 | 64.2 | satisfactory |
| 4 | none | 15 | 64.2 (only for stiffened portion) | not wholly stiffened, slurry partially left |
| 5 | none | 45 | 64.4 | satisfactory |
| 6 | none | 120 | 64.3 | satisfactory |

As described above, by the invention, molded ceramic articles having a high density and a smoothed surface, could be surely produced in a relatively short time.

In order to further demonstrate the advantages of the inventive method, comparative tests were conducted with various combinations of filters and molds as shown in Table 13. In performing this comparison, the following parameters were maintained.

To obtain a molding time necessary for industrial application a preset number of through-holes per unit area of a metal plate is required. To this end, it is preferable to provide through-holes at a pitch of not more than 10 mm in the metal plate. If the through-hole pitch exceeds 10 mm, removal of the solvent in the slurry becomes time-consuming which is industrially disadvantageous.

As starting powders, $Si_3N_4$ (90–95 wt %) with the mean primary particle size of 0.2 μm and the mean secondary particle size of 0.5 μm, as a main component, and $Y_2O_3$, with the mean primary particle size of 0.5 μm and $Al_2O_3$ with the mean primary particle size of 0.3 μm, as additives, were used. The starting powders were mixed in a ball mill with distilled water and added to a binder to give a slurry with a volumetric concentration of the powders of 42 vol %.

The mean secondary particle size of the slurry was 0.53 μm (with the particle size of the main component of 0.5 μm which is raised to 0.53 μm under the effect of the additives). Using this slurry, a cylinder having a diameter of 10 mm and a length of 50 mm was produced. In this case aspect ratio is 5 (50 mm/10 mm).

The concept of the molding method is shown in FIG. 2. The molding equipment basically included punch 1, die 2, mold 3 and a dehydrator. Molding was performed by pressurizing the slurry within the die with a punch, as in the case of press molding. The moisture in the slurry was removed from the system via the dehydrator. The dehydrated slurry was solidified to give a molded article. Pressurization was performed evenly with a punch having the same cross-section as the product cross-section. Since the slurry intruded into the space between the punch and the slurry (clearance), a sealant such as an O-ring was provided therein.

The dehydrator included (i) a porous member formed of SUS (method 2), (ii) a porous member of SUS having a filter such as filter paper or filter cloth on the front surface, or (iii) an SUS plate having through-hole and a filter such as a filter paper or a filter cloth on its front side (method 3).

With (ii) and (iii), the slurry is not in direct contact with the porous member. Since the punch, die and the mold are formed of metal, such as cemented carbide, as in the case of customary press molding, it is possible to use a higher molding pressure than in the conventional case wherein the device in its entirety is formed by a porous member. In the embodiment illustrated, the punch and the cavity were formed of cemented carbide, while the mold was formed of high speed steel. The molding was carried out at an elevated pressure of 300 kgf/mm². For comparison, molding was also carried out in accordance with (method 3)-1 in which no sealant was used in the clearance between the punch and the die, and (method 3)-2 in which the die was formed of a resin used in a conventional casting mold.

The pressurizing conditions during molding were controlled by the molding time or punch displacement. The molding conditions were determined as later described. If the pressurization is insufficient, slurry dehydration in the vicinity of the punch becomes insufficient and a non-solid portion is left. Conversely, if excess pressurization is made, the punch is moved excessively to mechanically compact the molded product, thus locally increasing the powder packing density in the molded product in the vicinity of the punch. The result is poor dimensional accuracy and deformation of the sintered product. If the molded article exhibits significant density fluctuations in the molded article, the article undergoes cracks or destruction. From this it follows that the pressurization end timing must be within a certain range as from the time point when a present amount of the moisture in the slurry in the mold is dehydrated and the slurry in its entirety has been molded.

The slurry was used in a quantity which gave a molding length of 50 mm. The optimum pressurization end timing was set in accordance with one of the following two methods:

(i) timing control
within a time (sec) between T and 1.2T, wherein T was the pressurization time necessary to dehydrate all the slurry in the mold to give a molded product)
(ii) control of punch displacement
within 4% of the molding length as from the position at which the totality of the slurry within the mold is dehydrated to give a molded article.

Based on the above range, molding was carried out in accordance with a variety of molding time durations and punch displacements. The pore size and surface roughness of the porous member and the filter pore size, as other molding conditions, were also varied.

The relation of the various conditions, molding state and mold release properties were as shown in Table 13 and 14. The produced molded products were divided in five equal portions and the density of the mold products was measured. Density fluctuations in the molded products were calculated from the maximum and minimum density values.

TABLE 13

| | | | | | molding conditions | | | | | | |
|---|---|---|---|---|---|---|---|---|---|---|---|
| No. | Claims | method | filter | mean filter pore size ($\mu$m) | filter material | mean pore size of SUS ($\mu$m) | molding times (sec) | punch position (mm) | punch displacement (mm) | sealing O-ring | die material |
| 1 | Comp. Ex. | 3 | 1 | absent | — | — | 8.2 | 0.2 | 20x | 51.0x | present | cemented carbide |
| 2 | Ex. | 3 | 1 | absent | — | — | 8.2 | 0.2 | 25 | 50.0 | present | cemented carbide |
| 3 | Ex. | 3 | 1 | absent | — | — | 8.2 | 0.2 | 27 | 48.9 | present | cemented carbide |
| 4 | Comp. Ex. | 3 | 1 | absent | — | — | 8.2 | 0.2 | 45x | 47.5x | present | cemented carbide |
| 5 | Comp. Ex. | 4 | 2 | present | 0.4 | filter paper | 72.2 | 0.3 | 16x | 51.1x | present | cemented carbide |
| 6 | Ex. | 4 | 2 | present | 0.4 | filter paper | 72.2 | 0.3 | 20 | 50.0 | present | cemented carbide |
| 7 | Ex. | 4 | 2 | present | 0.4 | filter paper | 72.2 | 0.3 | 21 | 49.5 | present | cemented carbide |
| 8 | Comp. Ex. | 4 | 2 | present | 0.4 | filter paper | 72.2 | 0.3 | 23x | 47.7x | present | cemented carbide |
| 9 | Comp. Ex. | 5 | 3 | present | 5.0 | filter paper + cloth | through holes 700*[2] | — | 16x | 51.8x | present | cemented carbide |
| 10 | Ex. | 5 | 3 | present | 5.0 | filter paper + cloth | through holes 700*[2] | — | 20 | 50.0 | present | cemented carbide |
| 11 | Ex. | 5 | 3 | present | 5.0 | filter paper + cloth | through holes 700*[2] | — | 21 | 49.4 | present | cemented carbide |
| 12 | Comp. Ex. | 5 | 3 | present | 5.0 | filter paper + cloth | through holes 700*[2] | — | 24x | 47.0x | present | cemented carbide |
| (10) | Ex. | | 3 | present | 5.0 | filter paper + cloth | through holes 700* | — | 20 | 50.0 | present | cemented carbide |
| 13 | Comp. Ex. | 5 | 3 | present | 5.0 | filter paper + cloth | through holes 1200x | — | 20 | 50.0 | present | cemented carbide |
| 14 | Comp. Ex. | 5 | 3 | present | 5.0 | filter paper + cloth | through holes 2000x | — | 19 | 50.0 | present | cemented carbide |
| 15 | Comp. Ex. | 5 | 3 | present | 5.0 | filter paper + cloth | through holes 2400x | — | 20 | 50.0 | present | cemented carbide |
| (2) | Ex. | | 1 | absent | — | — | 8.2 | 0.2 | 25 | 50.0 | present | cemented carbide |
| 16 | Comp. Ex. | 6 | 1 | absent | — | — | 20.1x | 0.2 | 25 | 50.0 | present | cemented carbide |
| 17 | Comp. Ex. | 6 | 1 | absent | — | — | 72.2x | 0.2 | 25 | 50.0 | present | cemented carbide |
| 16 | Comp. Ex. | 7 | 1 | absent | — | — | 8.2 | | 25 | 50.0 | present | cemented carbide |
| 19 | Comp. Ex. | 8 | 2 | present | 0.05x | resin film | 20.1 | 0.2 | 359 | 50.0 | present | cemented carbide |
| 20 | Comp. Ex. | 8 | 2 | present | 0.05x | resin film | 72.2 | 0.3 | 354 | 50.0 | present | cemented carbide |
| 21 | Ex. | 8 | 2 | present | 0.4 | filter paper | 20.1 | 0.2 | 20 | 50.0 | present | cemented carbide |
| (6) | Ex. | | 3 | present | 0.4 | filter paper | 72.2 | 0.3 | 20 | 50.0 | present | cemented carbide |
| 22 | Ex. | 8 | 2 | present | 0.4 | filter paper | 8.2 | 1.0 | 21 | 50.0 | present | cemented carbide |

TABLE 13-continued

| | | | | molding conditions | | | | | | | |
|---|---|---|---|---|---|---|---|---|---|---|---|
| No. | Claims | method | filter | mean filter pore size ($\mu$m) | filter material | mean pore size of SUS ($\mu$m) | molding times (sec) | punch position (mm) | punch displacement (mm) | sealing O-ring | die material |
| 23 | Ex. | 8 | 2 | present | 5.0 | filter paper | 20.1 | 0.2 | 19 | 50.0 | present | cemented carbide |
| 24 | Ex. | 8 | 2 | present | 5.0 | filter paper | 72.2 | 0.3 | 20 | 50.0 | present | cemented carbide |
| 25 | Ex. | 8 | 2 | present | 5.0 | filter paper | 8.2 | 1.0 | 18 | 50.0 | present | cemented carbide |
| 26 | Comp. Ex. | 8 | 2 | present | 27.7x | filter cloth | 20.1 | 0.2 | 18 | 50.0 | present | cemented carbide |
| 27 | Comp. Ex. | 8 | 2 | present | 27.7x | filter cloth | 72.2 | 0.3 | 18 | 50.0 | present | cemented carbide |
| 28 | Comp. Ex. | 8 | 2 | present | 27.7x | filter cloth | 8.2 | 1.0 | 19 | 50.0 | present | cemented carbide |
| (10) | Ex. | | 3 | present | 5.0 | filter paper + cloth | through holes 700 | — | 20 | 50.0 | present | cemented carbide |
| 29 | Comp. Ex. | 8 | 3 | present | 27.7x | filter cloth | through holes 700 | — | 18 | 50.0 | present | cemented carbide |
| (10) | Ex. | | 3 | present | 5.0 | filter paper + cloth | through holes 700 | — | 20 | 50.0 | present | cemented carbide |
| 30 | Comp. Ex. | 9 | 3 | present | 5.0 | filter paper + cloth | through holes 700 | — | 20 | 50.0 | absent x | cemented carbide |
| 31 | Comp. Ex. | 10 | 3 | present | 5.0 | filter paper + cloth | through holes 700 | — | — | — | — | resin |
| 32 | Comp. Ex. | 11 | 3 | present | 5.0 | filter paper + cloth | through holes (pitch 12)x | — | 120 | 50.0 | present | cemented carbide |

*[1]: distance between punch surface and filter surface (when it is 50, all the slurry solidifies)
*[2]: through-hole pitch is 5 mm unless specified
x mark denotes not being claimed

TABLE 14

| | | results of molding | | | | |
|---|---|---|---|---|---|---|
| No. | | density of molded body (g/cm$^2$) | molded state | mold release properties | defects of molded articles | density fluctuations (%) |
| 1 | Comp. Ex. | 63.5 | dehydration incomplete | — | non-solidified | 1.8 |
| 2 | Ex. | 63.9 | good | good | good | 0.3 |
| 3 | Ex. | 64.0 | good | good | good | 0.3 |
| 4 | Comp. Ex. | 64.5 | good | good | cracking | 2.9 |
| 5 | Comp. Ex. | 64.1 | dehydration incomplete | — | non-solidified | 1.8 |
| 6 | Ex. | 64.3 | good | good | good | 0.4 |
| 7 | Ex. | 64.4 | good | good | good | 0.4 |
| 8 | Comp. Ex. | 64.9 | good | good | cracking | 2.7 |
| 9 | Comp. Ex. | 63.2 | dehydration incomplete | — | non-solidified | 1.7 |
| 10 | Ex. | 64.0 | good | good | good | 0.3 |
| 11 | Ex. | 64.1 | good | good | good | 0.3 |
| 12 | Comp. Ex. | 64.4 | good | good | cracking | 2.9 |
| (10) | Ex. | 64.0 | good | good | good | 0.3 |
| 13 | Comp. Ex. | 63.2 | good | good | protrusions 1 mm$\phi$ | 0.7 |
| 14 | Comp. Ex. | 63.1 | good | good | protrusions 1.7 mm$\phi$ | 0.8 |
| 15 | Comp. Ex. | 63.2 | good | good | protrusions 2 mm$\phi$ | 0.7 |
| (2) | Ex. | 63.9 | good | good | good | 0.3 |
| 16 | Comp. Ex. | 62.3 | good | x | peeling of molded product | 0.5 |

TABLE 14-continued

| | | results of molding | | | |
|---|---|---|---|---|---|
| No. | | density of molded body (g/cm²) | molded state | mold release properties | defects of molded articles | density fluctuations (%) |
| 17 | Comp. Ex. | 63.4 | good | x | peeling of molded product | 0.5 |
| 18 | Comp. Ex. | 62.2 | good | x | peeling of molded product | 0.4 |
| 19 | Comp. Ex. | 59.9 | difficulties in hydration, prolonged | good | good | 0.8 |
| 20 | Comp. Ex. | 59.8 | difficulties in hydration, prolonged | good | good | 0.9 |
| 21 | Ex. | 64.1 | good | good | good | 0.3 |
| (6) | Ex. | 64.3 | good | good | good | 0.4 |
| 22 | Ex. | 64.0 | good | good | good | 0.3 |
| 23 | Ex. | 63.9 | good | good | good | 0.3 |
| 24 | Ex. | 64.2 | good | good | good | 0.2 |
| 25 | Ex. | 64.1 | good | good | good | 0.2 |
| 26 | Comp. Ex. | 59.9 | slurry exrded into filter cloth | x | peeling of molded product | 1.8 |
| 27 | Comp. Ex. | 59.9 | slurry exrded into filter cloth | x | peeling of molded product | 2.0 |
| 29 | Comp. Ex. | 59.7 | slurry exrded into filter cloth | x | peeling of molded product | 1.9 |
| (10) | Ex. | 64.0 | good | good | good | 0.3 |
| 29 | Comp. | 59.5 | slurry exrded | — | non-solidified | 2.1 |
| (10) | Ex. | 64.0 | good | good | good | 0.3 |
| 30 | Comp. | 59.7 | slurry leakage | good | non-solidified | 2.3 |
| 31 | Comp. Ex. | — | die destroyed | — | — | — |
| 32 | Comp. Ex. | 63.7 | difficulties in dehydration | good | good | 0.9 |

By meeting the inventive molding, and simultaneously selecting the pressure and the mold of the type elucidated in the present specification, density fluctuations of the molded article are further reduced. In addition, such defects as the surface roughening phenomenon, cracking and/or surface exfoliation may be eliminated. As for a molded article having a smaller length to diameter (L/D) ratio, it is possible to utilize a broader range of the slurry conditions (secondary particle size distribution and density) than if only the mold of the type elucidated in the present specification is used. As for the L/D ratio, the boundary would be approximately equal to 1 (L/D≈1).

By further limiting the slurry conditions, that is the secondary particle size distribution and density, it becomes possible to obtain a product with a larger L/D ratio with a higher quality and at a higher speed. The above discussions may be summarized as shown in the following Table 15.

TABLE 15

| Claim | Operation and effect | Summary of the Examples |
|---|---|---|
| Contents of (a) and (b) above | As compared to the case of b) only, density fluctuations are reduced and defects may be eliminated. With the case of b) only, a homogeneous ceramic sintered article with high dimension accuracy and high strength may be produced. As compared to the case of b) only, it becomes possible to mold an article with a high L/D ratio under broader slurry conditions. Molding may be made at a high pressure and at a high speed. | By using a ceramic or metal mold, capable of producing slurries with certain broad ranges of $Si_3N_4$, $Al_2O_3$, $ZrO_2$ or SiC and withstanding high pressure as shown in the present specification, or by simultaneously using a filter shown in the present specification, the effects given on the left side may be achieved. |
| Contents of d) | By further limiting the slurry conditions, articles of more intricate shape can be produced, in addition to the above effects. | By selecting slurry conditions and using the above material, and by combining the above various mold types and molds of the specific shape, the effects shown on the left are produced. |

We claim:

1. A wet press molding method in which a slurry of ceramics is charged into a cavity and uniaxially pressed by a punch to remove an excess liquid from a portion facing the punch to effect molding, wherein the improvement comprising completing pressing the slurry when punch displacement from a punch position corresponding to discharge of the excess liquid from the entire slurry in the mold to produce a molded mass is less than 17% of a total molding length, L.

2. The method of claim 1 wherein a porous member of ceramics or metal is employed at a solvent removing portion.

3. The method of claim 2 wherein a mean pore diameter of the porous member of metal or ceramics in contact with the slurry is not more than 20 times a mean particle size of the secondary particles of a powder present in the slurry.

4. The method of claim 2 wherein a surface of the porous member of ceramics or metal in contact with the slurry has a surface roughness of not higher than 0.4 μm Rz defined by JIS B 0601.

5. The method of claim 1 wherein a porous member of ceramics or metal having a filter paper and/or a filter cloth on its front surface is employed at a solvent removing portion.

6. The method of claim 5 wherein said filter paper and/or filter cloth has a mean pore diameter of not less than 0.1 μm and not more than 20 times the mean particle size of secondary particles of a powder which are agglomerated particles of primary particles of the powder in the slurry to be molded.

7. The method of claim 1 wherein a metal plate having through holes with diameters of 0.8 mm or less and a filter paper arid/or a filter cloth on its front surface are employed at a solvent removing portion.

8. The method of claim 7 wherein said filter paper and/or filter cloth has a mean pore diameter of not less than 0.1 μm and not more than 20 times the mean particle size of secondary particles of a powder which are agglomerated particles of primary particles of the powder in the slurry to be molded.

9. The method of claim 7 wherein the through-holes are provided at a pitch 10 mm or less.

10. The method of claim 1 wherein a sealing member is provided at a cavity-punch slide portion.

11. The method of claim 1 wherein an abrasion resistant metal material is used to from the cavity and punch.

12. The method of claim 1 wherein a porous member of ceramics or metal having a filter paper and/or a filter cloth on its front surface is employed at a liquid removing portion.

13. The method of claim 1 wherein a metal plate having through-holes with diameters of 0.8 mm or less and a filter paper and/or a filter cloth on its front surface are employed at a liquid removing portion.

14. The method of claim 1 wherein a viscosity of the slurry is less than 5000 cps.

15. The method of claim 1 wherein a volume fraction of powders in the slurry is less than 60 vol %.

16. A wet press molding method is which a ceramics slurry is charged into a cavity and uniaxially pressed by a punch to remove an excess liquid from a portion facing the punch to effect molding, and in which the aspect ratio (molding length/section size ratio) of the molding article is more than 1, wherein the improvement comprising completing pressing the slurry when punch displacement from a punch position corresponding to discharge of excess liquid from the entire slurry in the mold to produce a molded mass is less than 4% of a total molding length, L.

17. The method of claim 16 wherein a porous member of ceramics or metal is employed at a solvent removing portion.

18. The method of claim 16 wherein porous member or ceramics or metal having a filter paper and/or a filter cloth on its front surface is employed at a liquid removing portion.

19. The method of claim 16 wherein a metal plate having through-holes with diameters of 0.8 mm or less and a filter paper and/or a filter cloth on its front surface are employed at a liquid removing portion.

20. The method of claim 16 wherein a sealing member is provided at a cavity-punch slide portion.

21. The method of claim 16 wherein an abrasion resistant metal is used to form the cavity and punch.

22. The method of claim 16 wherein a viscosity of the slurry is less than 5000 cps.

23. The method of claim 16 wherein a volume fraction of powders in the slurry is less than 60 vol %.

* * * * *